United States Patent
Archer et al.

(10) Patent No.: US 7,853,639 B2
(45) Date of Patent: Dec. 14, 2010

(54) PERFORMING PROCESS MIGRATION WITH ALLREDUCE OPERATIONS

(75) Inventors: Charles Jens Archer, Rochester, MN (US); Amanda Peters, Rochester, MN (US); Brian Paul Wallenfelt, Plymouth, MN (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 11/531,175

(22) Filed: Sep. 12, 2006

(65) Prior Publication Data
US 2010/0185718 A1    Jul. 22, 2010

(51) Int. Cl.
*G06F 9/46*    (2006.01)
(52) U.S. Cl. ...................... 709/201; 718/100
(58) Field of Classification Search ................ 709/201; 718/1, 100, 104
See application file for complete search history.

(56) References Cited

U.S. PATENT DOCUMENTS

| | | | |
|---|---|---|---|
| 3,885,169 A * | 5/1975 | Heightley | 326/35 |
| 5,218,676 A | 6/1993 | Ben-Ayed et al. | |
| 5,347,450 A | 9/1994 | Nugent | |
| 5,453,978 A | 9/1995 | Sethu et al. | |
| 5,517,662 A * | 5/1996 | Coleman et al. | 709/201 |
| 5,745,703 A * | 4/1998 | Cejtin et al. | 709/238 |
| 5,933,425 A | 8/1999 | Iwata | |
| 5,944,779 A * | 8/1999 | Blum | 709/201 |
| 6,081,506 A | 6/2000 | Buyukkoc et al. | |
| 6,486,983 B1 | 11/2002 | Beshai et al. | |
| 6,748,413 B1 | 6/2004 | Bournas | |
| 6,789,126 B1 * | 9/2004 | Saulpaugh et al. | 709/245 |
| 7,065,549 B2 * | 6/2006 | Sun et al. | 709/201 |
| 7,319,695 B1 | 1/2008 | Agarwal et al. | |
| 7,444,385 B2 * | 10/2008 | Blumrich et al. | 709/217 |
| 2004/0001508 A1 | 1/2004 | Zheng et al. | |
| 2005/0018682 A1 | 1/2005 | Ferguson et al. | |
| 2005/0068946 A1 | 3/2005 | Beshai | |

(Continued)

OTHER PUBLICATIONS

Ribler, Randy L et al, "The Autopilot performance-directed adaptive control system", Future Generations Computer Systems, Elsevier Science Publishers, Amsterdam, NL, vol. 18, No. 1, Sep. 1, 2001, pp. 175-187.

(Continued)

*Primary Examiner*—Saleh Najjar
*Assistant Examiner*—Marie Georges Henry
(74) *Attorney, Agent, or Firm*—Owen J. Gamon; Grant A. Johnson

(57) ABSTRACT

Compute nodes perform allreduce operations that swap processes at nodes. A first allreduce operation generates a first result and uses a first process from a first compute node, a second process from a second compute node, and zeros from other compute nodes. The first compute node replaces the first process with the first result. A second allreduce operation generates a second result and uses the first result from the first compute node, the second process from the second compute node, and zeros from others. The second compute node replaces the second process with the second result, which is the first process. A third allreduce operation generates a third result and uses the first result from first compute node, the second result from the second compute node, and zeros from others. The first compute node replaces the first result with the third result, which is the second process.

18 Claims, 7 Drawing Sheets

U.S. PATENT DOCUMENTS

2005/0100035 A1 5/2005 Chiou et al.
2005/0108425 A1 5/2005 Rabinovitch
2006/0002424 A1 1/2006 Gadde
2008/0016249 A1 1/2008 Ellis et al.

OTHER PUBLICATIONS

Zhang, Yan et al, "Automatic Performance Tuning for J2EE Application Server Systems", Lecture Notes in Computer Science, vol. 3806, 2005, pp. 520-527.

Chung, I-Hsin et al, "Automated cluster-based web service performance tuning", High Performance Distributed Computing, 2004, Proceedings of the 13th IEEE International Symposium on Honolulu, HI, USA, Jun. 4-6, 2004, Piscataway, NJ, USA, IEEE, Jun. 4, 2004, pp. 36-44.

Hondroudakis, Anna et al, "An Empirically Derived Framework for Classifying Parallel Program Performance Tuning Problems", Proceedings of the Sigmetrics Symposium on Parallel and Distributed Tools, SPDT 1998, Welches, OR, Aug. 3-4, 1998, Sigmetrics Symposium on Parallel and Distributed Tools, New York, NY, US, ACM, vol. SYMP.2, Aug. 3, 1998, pp. 112-123.

* cited by examiner

US 7,853,639 B2

PERFORMING PROCESS MIGRATION WITH ALLREDUCE OPERATIONS

STATEMENT REGARDING FEDERALLY SPONSORED RESEARCH OR DEVELOPMENT

This invention was made with Government support under Contract No. B519700 awarded by the Department of Energy. The Government has certain rights in this invention.

FIELD

An embodiment of the invention generally relates to computer systems and more specifically relates to process migration between compute nodes that are connected via a global combining network.

BACKGROUND

Computer systems often have more than one processor, in order to increase performance. In fact, massively parallel computing structures (also referred to as "ultra-scale computers" or "supercomputers") interconnect large numbers (tens of thousands) of nodes, each of which includes a processor or processors. Often, the nodes are connected by a network topology in a tree, torus, or mesh form that supports message passing. One example of a supercomputer is the IBM System Blue Gene® Solution available from International Business Machines Corporation of Armonk, N.Y.

On supercomputers, a parallel program is typically divided into processes, and the processes execute on various nodes and communicate to each other via message passing. The cost of communications between the nodes varies depending on the distance between the nodes involved and other factors such as the availability of buffers, the number of available paths through the network, and network contention. An important challenge in supercomputer design is to optimally map the parallel program to the nodes, in order to minimize the total execution time of the parallel program, which is a function of both the time for communication and the time for computation. Since the communication of the parallel program changes over time as the processes execute, the optimal mapping also changes. Thus, in an attempt to keep the execution time of the parallel program low, supercomputers use process migration algorithms to detect non-optimal communications between the nodes and respond by moving the processes between the nodes. Unfortunately, current process migration algorithms use significant amounts of temporary storage, which is expensive, and are difficult to scale to the large number of nodes used on new supercomputers.

Thus, what is needed is a process migration algorithm that performs well, scales to large number of processes, and does not require temporary storage.

SUMMARY

A method, apparatus, system, and signal-bearing medium are provided. In an embodiment, compute nodes receive a migration event that specifies two of the compute nodes. In response to the migration event, the compute nodes in the partition perform allreduce XOR operations that swap a first process at a first compute node with a second process at a second compute node. In an allreduce XOR operation, each of the compute nodes contributes input to the allreduce XOR operation and receives output from the allreduce XOR operation. The compute nodes in the partition perform a first allreduce XOR operation, in which the first compute node contributes the first process, the second compute node contributes the second process, and all other compute nodes contribute zeros. The first compute node replaces the first process with a first result of the first allreduce XOR operation. The compute nodes then perform a second allreduce XOR operation, in which the first compute node contributes the first result, the second compute node contributes the second process, and all other compute nodes contribute zeros. The second compute node replaces the second process with a second result of the second allreduce XOR operation, and the second result is identical to the first process. The compute nodes then perform a third allreduce XOR operation, in which the first compute node contributes the first result, the second compute node contributes the second result, and all other compute nodes contribute zeros. The first compute node replaces the first result with a third result of the third allreduce XOR operation, and the third result is identical to the second process. In this way, in an embodiment, processes are swapped between compute nodes without the use of temporary storage.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, compute nodes are connected via a global combining network. A partition of the compute nodes receives a migration event that specifies first and second compute nodes that execute processes that need to be swapped. In response to the migration event, the compute nodes in the partition perform allreduce XOR (exclusive-or) operations that swap a first process at the first compute node with a second process at the second compute node. In an allreduce operation, each of the compute nodes in the partition contributes input to the allreduce operation and receives output from the allreduce operation.

The compute nodes in the partition perform a first allreduce XOR operation, in which the first compute node contributes the first process to the allreduce XOR operation, the second compute node contributes the second process, and all other compute nodes contribute zeros. The first compute node replaces the first process with a first result of the first allreduce XOR operation. The compute nodes then perform a second allreduce XOR operation, in which the first compute node contributes the first result, the second compute node contributes the second process, and all other compute nodes in the partition contribute zeros. The second compute node replaces the second process with a second result of the second allreduce XOR operation, and the second result is identical to the first process. The compute nodes in the partition then perform a third allreduce XOR operation, in which the first compute node contributes the first result, the second compute node contributes the second result, and all other compute nodes in the partition contribute zeros. The first compute node replaces the first result with a third result of the third allreduce operation, and the third result is identical to the second process. In this way, in an embodiment, processes are swapped between compute nodes without the use of temporary storage.

Figure 1:
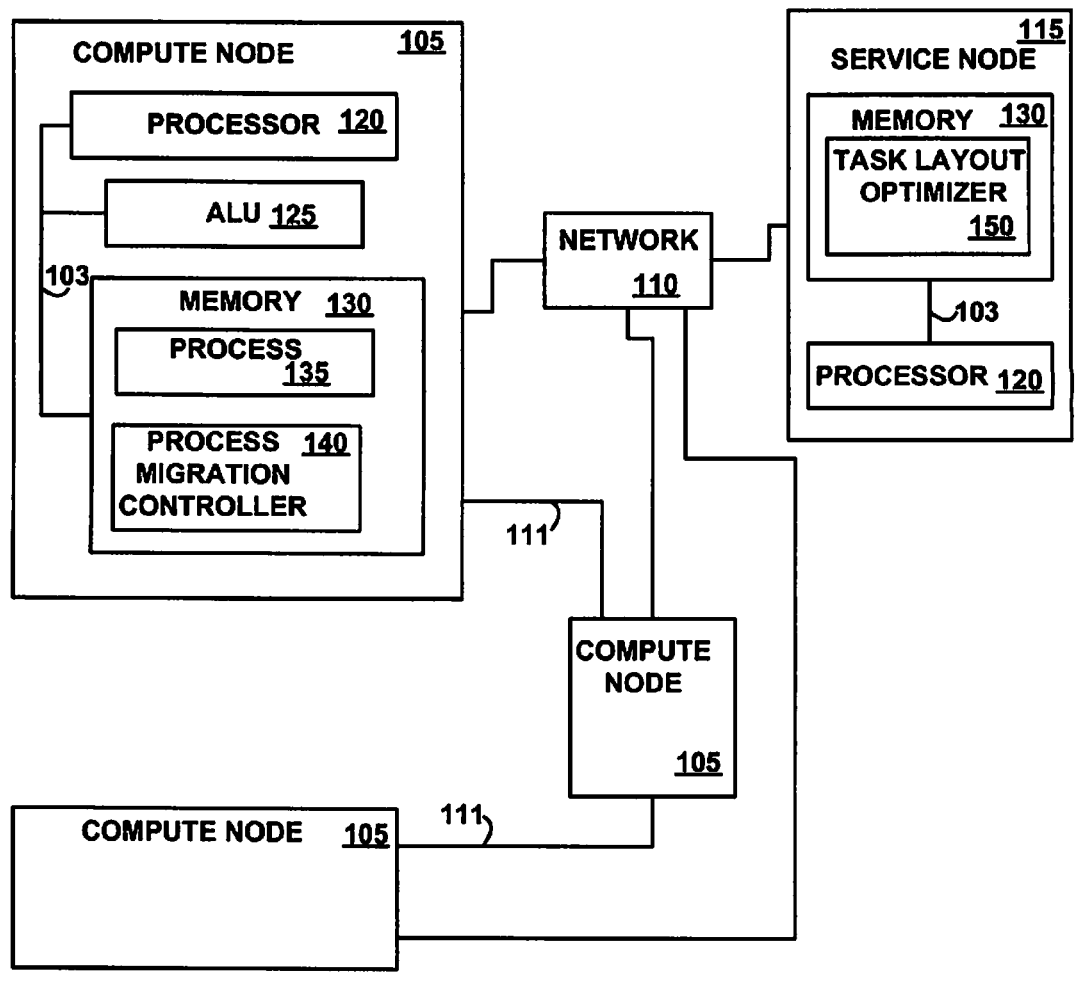
FIG. 1 depicts a high-level block diagram of an example computer system for implementing an embodiment of the invention.

Referring to the Drawings, wherein like numbers denote like parts throughout the several views, FIG. 1 depicts a high-level block diagram representation of a computer system 100, according to an embodiment of the present invention. In an embodiment, the hardware components of the computer system 100 may be implemented by an IBM System Blue Gene® computer system available from International Business Machines Corporation of Armonk, N.Y. Additional information concerning the architecture and control systems of the Blue Gene system can be found in commonly assigned and co-pending U.S. patent application Ser. No. 11/316,247 by Bryant et al., entitled "Method and Apparatus for Improving Block Allocation Times in a Computer System" and Ser. No. 11,425,773 by Gooding, entitled "Method and apparatus for Analyzing Error Conditions in a Massively Parallel Computer System by Identifying Anomalous Nodes within a Communication Set," which are herein incorporated by reference. However, those skilled in the art will appreciate that the mechanisms and apparatus of embodiments of the present invention apply equally to any appropriate computing system.

The major components of the computer system 100 include multiple compute nodes 105 and a service node 115, all of which are connected via a network 110. The compute nodes 105 are also interconnected via a global combining network 111. These compute nodes 112 are the workhorse of the massively parallel system 100, and are intended for executing compute-intensive applications which may require a large number of processes proceeding in parallel. In one embodiment, the compute nodes 105 are arranged into M "Psets," each containing a single I/O node (not shown) and N compute nodes 105, for a total of M×N compute nodes 105. The product M×N can be very large. For example, in one implementation M=1024 (1K) and N=64, for a total of 64,000 compute nodes 105.

In general, the compute nodes 105 are logically arranged in a three-dimensional lattice, each compute node having a respective x, y and z coordinate. Each compute node 105 in the lattice contains a set of six node-to-node communication links for communicating data with its six immediate neighbors in the x, y and z coordinate dimensions. As used herein, the term "lattice" includes any regular pattern of nodes 105 and inter-nodal data communications paths in more than one dimension, such that each node 105 has a respective defined set of neighbors, and such that, for any given node, it is possible to algorithmically determine the set of neighbors of the given node from the known lattice structure and the location of the given node in the lattice. A "neighbor" of a given node 105 is any node 105 which is linked to the given node 105 by a direct inter-nodal data communications path, i.e. a path which does not have to traverse another node. A "lattice" may be three-dimensional, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes 105 to the given node 105, although it is generally desirable to arrange the nodes 105 in such a manner, insofar as possible, as to provide physical proximity of neighbors.

In one embodiment, the node lattice logically wraps to form a torus in all three coordinate directions, and thus has no boundary nodes. E.g., if the node lattice contains dimx nodes in the x-coordinate dimension ranging from 0 to (dimx−1), then the neighbors of Node((dimx−1), y0, z0) include Node((dimx−2), y0, z0) and Node (0, y0, z0), and similarly for the y-coordinate and z-coordinate dimensions. It will be understood that, although this arrangement is a preferred embodiment, a logical torus without boundary nodes is not necessarily a requirement of a lattice structure.

This aggregation of node-to-node communication links is referred to herein as the torus network. The torus network permits each compute node to communicate results of data processing tasks to neighboring nodes for further processing in certain applications which successively process data in different nodes 105. However, it will be observed that the torus network contains only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes 105 within any block may execute a common application code function or sequence.

With continuing reference to FIG. 1, each of the compute nodes 105 includes one or more processors 120, an arithmetic logic unit (ALU) 125, and memory 130, all of which are coupled for inter-component communication via a bus 103. The processor 120 executes instructions stored in the memory 130 and may include one or more levels of on-board cache.

The memory 130 is a random-access semiconductor memory for storing or encoding data and programs. The memory 130 is conceptually a single monolithic entity, but in other embodiments the memory 130 is a more complex arrangement, such as a hierarchy of caches and other memory or storage devices. For example, memory may exist in multiple levels of caches, and these caches may be further divided by function, so that one cache holds instructions while another holds non-instruction data, which is used by the processor or processors 120. In various embodiments, the memory 130, or a portion of the memory 130, may be implemented via RAM (Random Access Memory), ROM (Read Only Memory), an EPROM (Erasable Programmable Read Only Memory), a disk drive, any other type of memory, or any multiple or combination thereof.

The memory 130 stores or encodes a process 135 and a process migration controller 140. The compute node 105 may use virtual addressing mechanisms that allow the programs of the compute node 105 to behave as if they only have access to a large, single storage entity instead of access to multiple, smaller storage entities. Thus, while the process 135 and the process migration controller 140 are illustrated as being contained within the memory 130, these elements are not necessarily all completely contained in the same storage device at the same time.

In an embodiment, any one compute node 105 only stores and executes one process 135, but in other embodiments any number of processes may be stored and executed at a single compute node 105. A process 135 is an executable portion of a job, and a job is divided into multiple of the processes 135. These multiple processes 135 that make up a job are distributed among multiple of the compute nodes 105, where the processes 135 may execute concurrently. In various embodiments, a job may be an application, an operating system, a user application, a third-party application, a task, a thread, or any combination, multiple, or portion thereof that is capable of being broken into multiple processes 135, containing executable instructions, for concurrent execution by multiple processors 120 at multiple compute nodes 105. The processes 135 at different compute nodes 105 communicate with each other by sending each other messages that include one or more packets of data and routing or control information. Examples of data that the processes may send to each other include data used by variables of the job, but any data may be sent. The processes 135 may include executable code or interpretable statements and data, such as variables and program stacks.

In an embodiment, the process migration controller 140 includes instructions capable of executing on the processor 120 or statements capable of being interpreted by instructions executing on the processor 120 to perform the functions as further described below with reference to FIGS. 5, 6, and 7. In another embodiment, the process migration controller 140 may be implemented in microcode. Although the process migration controller 140 is illustrated as being encoded in the memory 130 and executed on the processor 120, in another embodiment, the process migration controller 140 may instead be implemented in hardware via logic gates and/or other appropriate hardware techniques.

The arithmetic logic unit 125 calculates the results of arithmetical computations, such as arithmetic operations (e.g., addition, subtraction, and multiplication), bitwise logic operations (e.g., AND, NOT, OR, and XOR), and bit-shifting operations (shifting or rotating a word by a specified number of bits to the left or right, with or without a sign extension). The ALU 125 combines incoming packets from the global combining network 111 using bitwise and integer operations and forwards the resulting packet to the global combining network 111. In an embodiment, the global combining network 111 connects the compute nodes 105 in a binary spanning tree, in which the compute nodes 105 either have none, one, or two child compute nodes 105, but in other embodiments any appropriate network topology may be used.

The network 110 may be any suitable network or combination of networks and may support any appropriate protocol suitable for communication of data and/or code to/from the compute nodes 105 and the service node 115. In an embodiment, the network 110 may be implemented via an Ethernet network, but in other embodiments any appropriate network or combination of networks implementing any appropriate protocol may be used. In another embodiment, the network 110 may represent a storage device or a combination of storage devices, either connected directly or indirectly to the computer system 100.

Although only the networks 110 and 111 are illustrated, in other embodiments additional networks may be present, such as the 3D torus network described above for point-to-point communication between the compute nodes 105 and a global barrier and interrupt network. Although the only types of nodes illustrated within the computer system 100 are the compute nodes 105 and the service node 115, in another embodiment other types of nodes may also be present, such as I/O (Input/Output) nodes, which may be connected via a different network.

The service node 115 includes a processor 120 and memory 130 connected via a memory bus 103. The memory 130 stores or encodes a task layout optimizer 150, which executes on the processor 120 at the service node 115. In another embodiment, the task layout optimizer 150 may be stored in and execute at one or more of the compute nodes 105. The task layout optimizer 150 detects sub-optimal communication between the compute nodes 105 and, in response, selects pairs of the processes 135 executing at respective pairs of the compute nodes 105 and requests that the compute nodes 105 swap the pairs of the processes 135. Processing for the task layout optimizer 150 is further described below with reference to FIG. 4.

It should be understood that FIG. 1 is intended to depict the representative major components of the computer system 100 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100 that, when read and executed by one or more processors 120 in the computer system 100 cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor or processors 120. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive or the memory 130; or (3) information conveyed to the computer system 100 by a communications medium, such as through a computer or a telephone network, e.g., the network 110.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
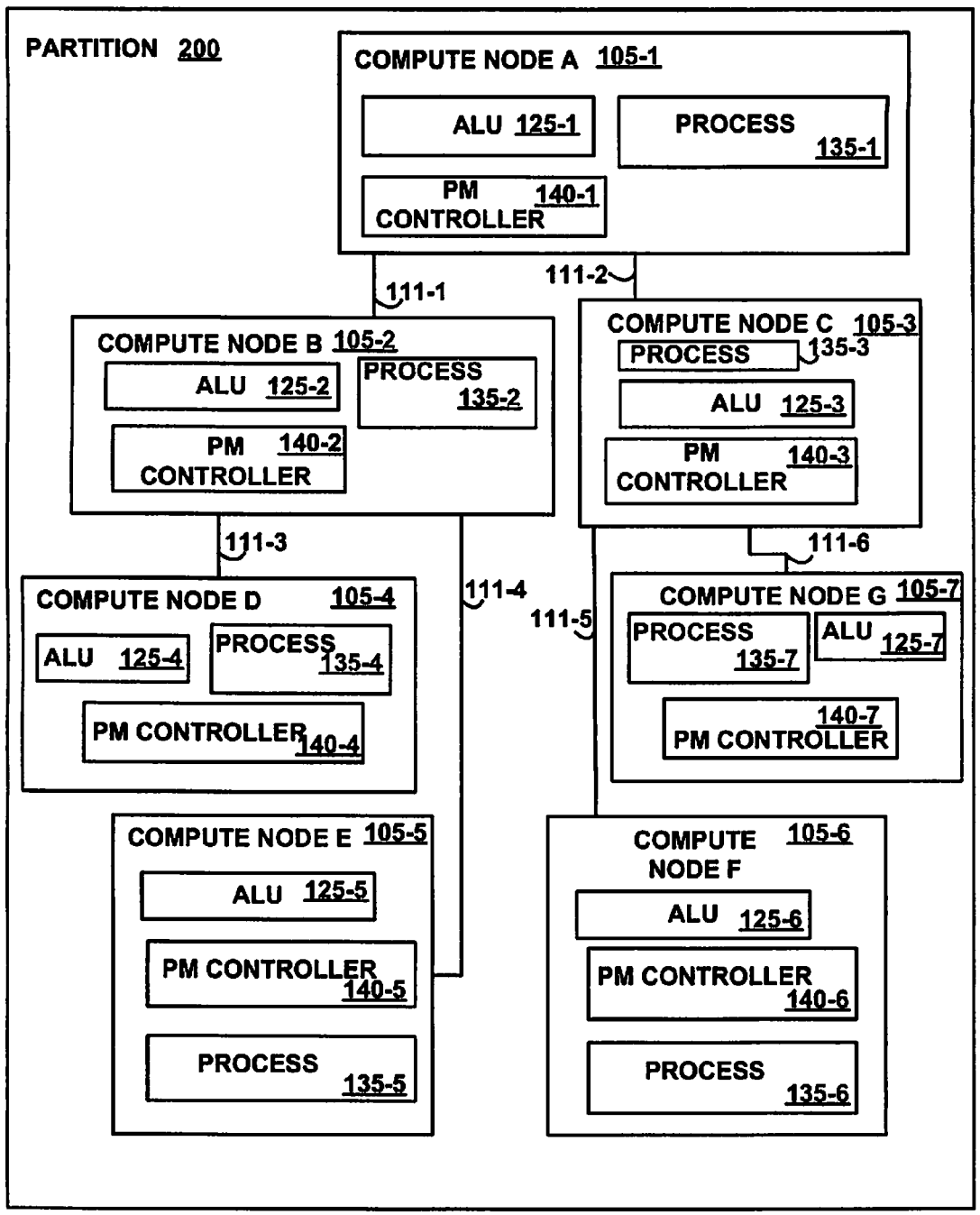
FIG. 2 depicts a block diagram of select components of an example partition within the computer system, according to an embodiment of the invention.

FIG. 2 depicts a block diagram of select components of an example partition 200 within the computer system 100 (FIG. 1), according to an embodiment of the invention. The compute nodes 105 of the computer system 100 may be subdivided into partitions 200, which are electrically-isolated and self-contained subsets of the compute nodes 105. A partition 200 is dedicated to the execution of a single job, which is divided into multiple processes 135 that execute at their respective compute nodes 105. At least some of the processes 135 execute concurrently. The task layout optimizer 150 selects a set of the compute nodes 105 and configures the selected set of the compute nodes 105 to form the partition 200.

The example partition 200 includes a portion of all of the compute nodes 105 in the computer system 100, and that portion is illustrated in FIG. 2 as the example compute nodes 105-1, 105-2, 105-3, 105-4, 105-5, 105-6, and 105-7, which are generically referred to as the compute node 105 (FIG. 1). Each of the compute nodes 105-1, 105-2, 105-3, 105-4, 105-5, 105-6, and 105-7 includes a respective ALU 125-1, 125-2, 125-3, 125-4, 125-5, 125-6, and 125-7, which are generically referred to as the ALU 125 (FIG. 1); a respective process 135-1, 135-2, 135-3, 135-4, 135-5, 135-6, and 135-7, which are generically referred to as the process 135 (FIG. 1); and a respective process migration controller 140-1, 140-2, 140-3, 140-4, 140-5, 140-6, and 140-7, which are generically referred to as the process migration controller 140 (FIG. 1).

The compute nodes 105-1, 105-2, 105-3, 105-4, 105-5, 105-6, and 105-7 in the partition 200 are connected in a binary tree structure via the global combining network 111 (FIG. 1), the various links of which are represented by the global combining network links 111-1, 111-2, 111-3, 111-4, 111-5, and 111-6. This aggregation of node-to-node communication links is referred to herein as the binary tree network. A binary tree structure represents a hierarchical organization of the linked compute nodes 105. A tree takes its name from an analogy to trees in nature, which have a hierarchical organization of branches and leaves. For example, a leaf is connected to a small branch, which further is connected to a large branch, and all branches of the tree have a common starting point at the root. Analogously, the compute nodes 105 in the partition 200 have a hierarchical organization, in that a compute node 105 has a relationship with another compute node, which itself may have a further relationship with other compute nodes, and so on. Thus, all of the compute nodes 105 in the partition 200 can be divided into sub-groups and groups that ultimately all have a relationship to the root compute node 105-1.

To define a tree more formally, a tree structure defines the hierarchical organization of the compute nodes 105. Hence, a tree is a finite set, T, of one or more of nodes, such that a) one specially designated node is called the root of the entire tree; and b) the remaining nodes (excluding the root) are partitioned into m$\geq$=0 disjoint sets $T_1, \ldots T_m$, and each of these sets is in turn a tree.

The trees $T_1, \ldots, T_m$, are called the subtrees of the root 105-1. Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node.

Thus, using the example partition 200 of FIG. 2, the root compute node of the partition 200 is the compute node 105-1. The root compute node 105-1 is the parent of its child compute nodes 105-2 and 105-3. The compute node 105-2 is the parent of its child compute nodes 105-4 and 105-5, which have no child compute nodes 105, so they are leaf nodes. The compute node 105-3 is the parent of its child compute nodes 105-6 and 105-7, which have no child compute nodes 105. The ancestor of the compute node 105-2 is the root compute node 105-1 of the partition 200. The ancestors of the compute node 105-4 are the compute node 105-2 and the root compute node 105-1 of the partition 200. The ancestors of the compute node 105-5 are the compute node 105-2 and the root compute node 105-1 of the partition 200. The ancestor of the compute node 105-3 is the root compute node 105-1 of the partition 200. The ancestors of the compute node 105-6 are the compute node 105-3 and the root compute node 105-1 of the partition 200. The ancestors of the compute node 105-7 are the compute node 105-3 and the root compute node 105-1 of the partition 200. The links 111-1, 111-2, 111-3, 111-4, 111-5, and 111-6 are each a portion of the global combining network 111 that connects two adjacent compute nodes 105 (a child compute node and its parent compute node).

The ALUs 125 at the compute nodes 105 act in combination to perform global reduction operations on data packets as they move along the global combining network 111. A global reduction operation computes a result from data that originates from all of the compute nodes 105 in the partition 200. In global reduction operations, packets of data move up the tree in the partition 200 from the leaf compute nodes through their ancestor compute nodes to the root compute node 105-1, and each ALU 125 at each compute node 105 performs an operation or operations on the data that it receives from its child compute nodes 105 and from its own memory 130 and sends the result to its parent compute node. After the root compute node 105-1 receives packets of data from its child compute nodes 105 and performs its reduction operation, the result of the global reduction operation is complete. The root compute node 105-1 may then send the result of the global reduction operation downward through the tree to one or more of its descendent compute nodes 105. If the root compute node 105-1 sends the result of the global reduction operation to all of its descendent compute nodes 105 (downward through the tree of the partition 200 via a broadcast message), then the global reduction operation is called an allreduce operation. An allreduce operation is thus a type of global reduction operation in which the result computed from data distributed across all of the compute nodes 105 of the partition 200 is made available to all of the compute nodes 105 in the partition 200.

Example global reduction operations include an arithmetic sum operation, a maximum value operation, a minimum value operation, and an exclusive-or operation. Exclusive-or, also known as an exclusive disjunction, is symbolized by XOR, EOR, or a plus sign (+), which is often used because an exclusive disjunction corresponds to addition modulo 2. XOR is a logical operation on two operands that results in a logical value or result of true (or "1") if and only if one of the operands, but not both, has a value of true (or "1"). Thus:

0XOR0=0,

0XOR1=1,

1XOR0=1,

1XOR1=0, and in an example of bitwise operations: 1110 XOR 1001=0111.

XOR is both an associative and commutative operation, and the following equations are true:

$AXOR0=A$, $AXORA=0$, $(AXORB)XORA=B$, and $(AXORB)XORB=A$, where A and B are any data of any length capable of representation in binary form.

An embodiment of the invention uses the principles of the aforementioned XOR equations to swap any two processes 135 in the partition 200 via three allreduce XOR operations. Consider the following example, in which the process 135-2 of the compute node 105-2 and the process 135-5 at the compute node 105-5 are swapped using three allreduce XOR operations, so that after the three allreduce XOR operations are complete, the process 135-2 is stored at (and executes on the processor at) the compute node 105-5 and the process 135-5 is stored at (and executes on the processor at) the compute node 105-2.

The first allreduce XOR operation performs (process 135-2) XOR (process 135-5)=R1 and stores the first result (R1) at the compute node 105-2, replacing or overwriting the contents of the process 135-2. The second allreduce XOR operation performs (R1) XOR (process 135-5)=R2 and stores the second result (R2) in the memory of the compute node 105-5, replacing or overwriting the contents of the process 135-5. Notice that, because of the properties of an XOR operation, R2 is identical to the process 135-2. The third allreduce XOR operation performs (R1) XOR (R2)=R3, and stores the third result (R3) in the memory of the compute node 105-2, replacing the content of R1. Notice that, because of the properties of an XOR operation, R3 is identical to the process 135-5. In the three allreduce XOR operations, the compute nodes 105-2 and 105-5 whose processes are being swapped contribute their respective processes (which may be the content of the original processes or an immediate result that has overwritten their processes) to the allreduce XOR operation, and all other compute nodes 105 in the partition 200 contribute zeros.

The following description provides further detail for the first allreduce XOR operation, and the second and third allreduce XOR operations may be understood by analogy. The process migration controller 140-4 at the compute node 105-4 sends zeros on the link 111-3 to the ALU 125-2 at the compute node 105-2. Thus, the process migration controller 140-4 is contributing zeros to the first allreduce XOR operation. The process migration controller 140-5 at the compute node 105-5 sends the process 135-5 on the link 111-4 to the ALU 125-2 at the compute node 105-2. Thus, the process migration controller 140-5 is contributing the process 135-5 to the first allreduce XOR operation.

The ALU 125-2 at the compute node 105-2 receives the zeros and the process 135-5 and performs an XOR operation to produce an intermediate result. The process migration controller 140-2 sends the process 135-2 to the ALU 125-2, which performs an XOR operation on the intermediate result and the process 135-2 to create a first result. Thus, the process migration controller 140-2 contributes the process 135-2 to the allreduce XOR operation. The ALU 125-2 then sends the first result via the link 111-1 to its parent compute node 105-1.

The ALU 125-6 at the compute node 105-6 sends zeros (contributes zeros to the allreduce XOR operation) on the link 111-5 to the ALU 125-3 at the compute node 105-3, and the ALU 125-7 at the compute node 105-7 sends zeros (contributes zeros to the allreduce XOR operation) on the link 111-6 to the ALU 125-3 at the compute node 105-3. The ALU 125-3 at the compute node 105-3 receives the zeros via the links 111-5 and 111-6 and performs an XOR operation that results in zeros. The ALU 125-3 then performs an XOR operation of the zeros with data (zeros) from the process migration controller 140-3, which also results in zeros. The ALU 125-3 then sends the zeros to the ALU 125-1 at the compute node 105-1 via the link 111-2.

The ALU 125-1 at the compute node 105-1 receives the first result from the compute node 105-2 and receives the zeros from the compute node 105-3. The ALU 125-1 performs an XOR operation on the first result and the zeros, which generates the first result. The ALU 125-1 then performs an XOR operation on the first result and the data supplied by the process migration controller 140-1 (contributing zeros to the allreduce XOR operation), which generates the first result. The ALU 125-1 then sends the first result in a broadcast message to its child compute nodes 105-2 and 105-3, each of which forwards the first result to their respective child compute nodes 105-4, 105-5, 105-6, and 105-7. The process migration controller 140-2 stores the first result in its memory 130 by overwriting or replacing the process 135-2. All of the other process migration controllers 140-1, 140-3, 140-4, 140-5, 140-6, and 140-7 discard the first result after forwarding it to their respective child compute nodes 105 (if any).

Figure 3:
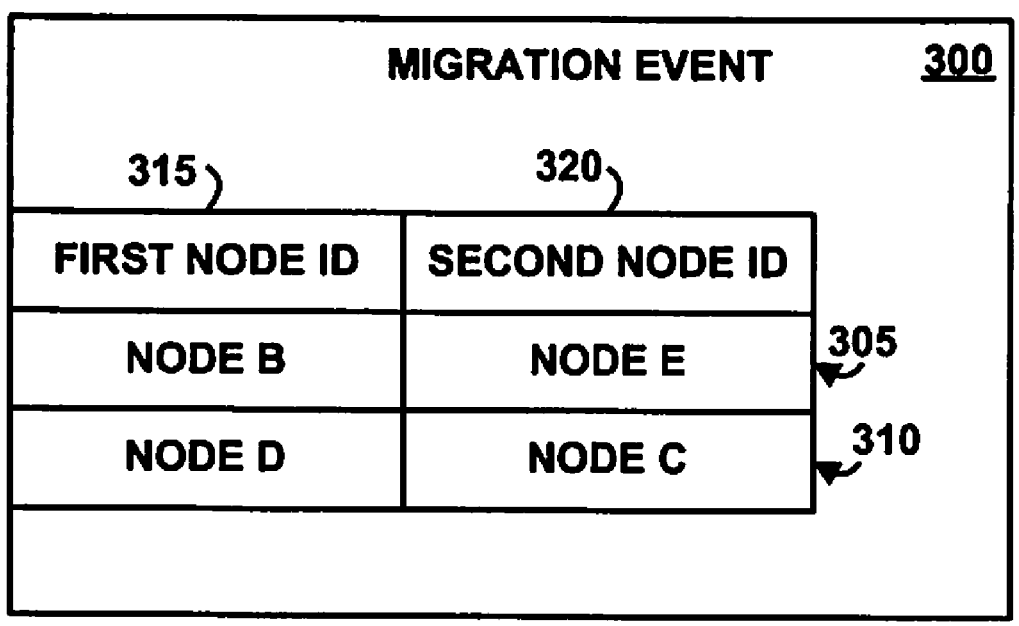
FIG. 3 depicts a block diagram of an example migration event, according to an embodiment of the invention.

FIG. 3 depicts a block diagram of an example migration event 300, according to an embodiment of the invention. The migration event 300 represents requests(s) to swap processes 135 between identified compute nodes 105. The task layout optimizer 150 creates the migration event 300 and sends the migration event 300 to the root compute node 105-1 of the partition 200, which sends the migration event 300 downward through the tree of the partition 200 to its descendant compute nodes 105. The migration event 300 is received and processed by the process migration controllers 140 at their respective compute nodes 105.

The migration event 300 includes example records 305 and 310, each of which includes a first compute node identifier 315 and a second compute node identifier 320. The first compute node identifier 315 and the second compute node identifier 320 both specify compute nodes 105 in a partition 200 of the computer system 100. Each of the records 305 and 310 represents a request to swap the processes 135 that are stored in the compute nodes 105 identified by the first compute node identifier 315 and the second compute node identifier 320. For example, the example record 305 represents a request to swap the process 135-2 at the compute node 105-2 with the process 135-5 at the compute node 105-5. In an embodiment, the compute nodes 105 only store and execute one process, so the first compute node identifier 315 and the second compute node identifier 320 represent whatever process is stored at the respective compute nodes 105. In another embodiment, the compute nodes 105 may store and execute more one process 135, so the first and second compute node identifiers may also specify the processes 135 at the respective compute nodes 105 to swap.

Swapping the processes 135 as requested by the record 305 means that after the swap is complete, the process 135-2 is removed from the memory 130 at the compute node 105-2, is stored in the memory 130 at the compute node 105-5, and is capable of executing, or does execute, on the processor 120 at the compute node 105-5. Swapping the processes 135 as requested by the record 305 further means that after the swap is complete, the process 135-5 is removed from the memory 130 at the compute node 105-5, is stored in the memory 130 at the compute node 105-2, and is capable of executing, or does execute, on the processor 120 at the compute node 105-2.

Figure 4:
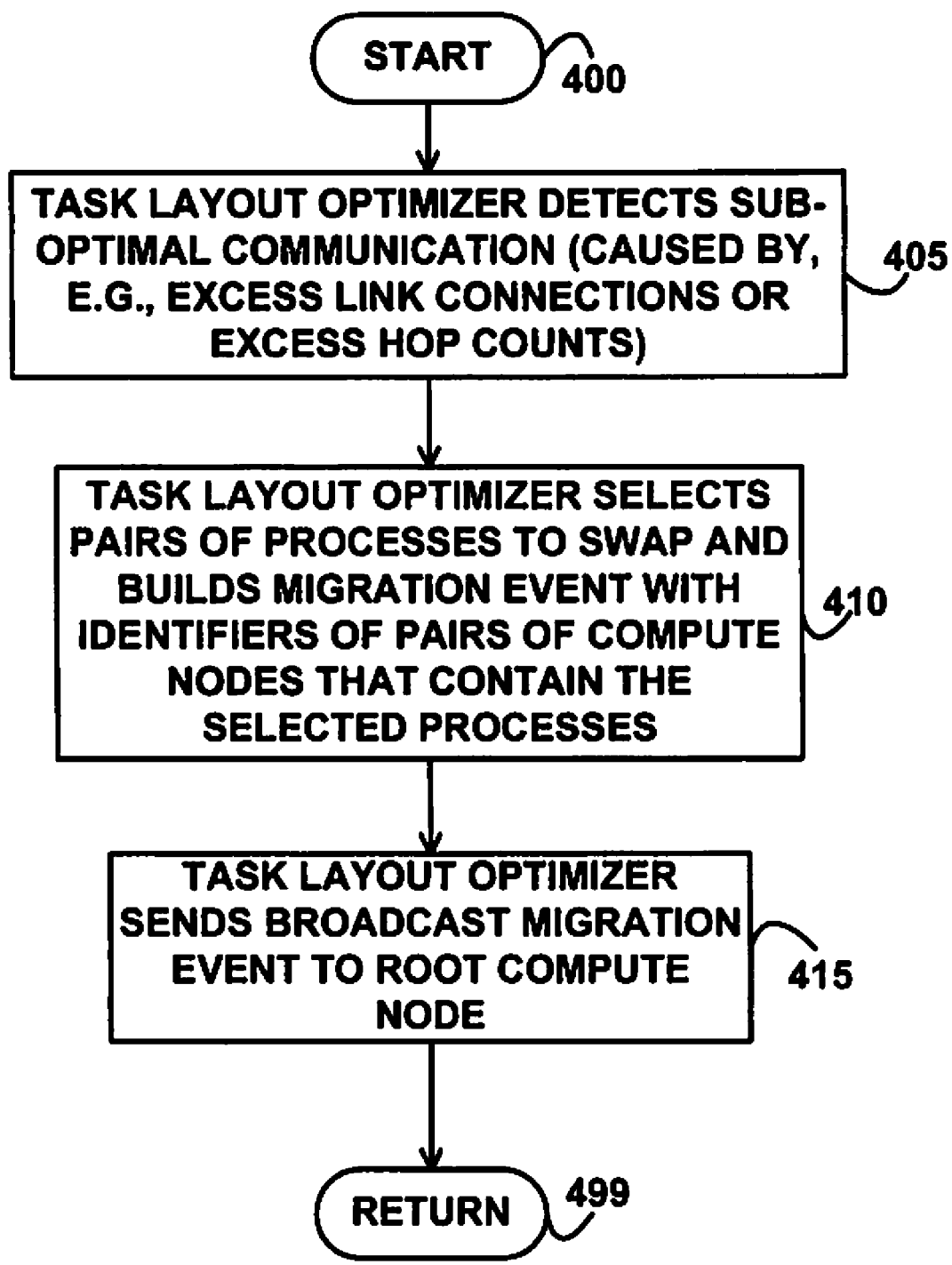
FIG. 4 depicts a flowchart of example processing for a task layout optimizer, according to an embodiment of the invention.

FIG. 4 depicts a flowchart of example processing for the task layout optimizer 150, according to an embodiment of the invention. Control begins at block 400. Control then continues to block 405 where the task layout optimizer 150 detects sub-optimal communication between the processes 135 at the compute nodes 105 of the partition 200. Sub-optimal communication causes degraded performance and slow execution time of the job that comprises the processes 135. In various embodiments, sub-optimal communication may be caused by excessive link connections between the processes 135 that are communicating or by excessive hop counts between the processes 135 that are communicating. Excessive link connections are caused by an excessive number of processes 135 communicating via the same links of the global combining network 111. Excessive hop counts are caused by an excessive number of links of the global combining network 111 between the sending compute node and the receiving compute node on which the message must travel. For example, if the process 135-2 at the compute node 105-2 sends a message to the process 135-5 at the compute node 105-5, the number of links on which the message travels (the hop count) is only one link, the link 111-4. But, if the process 135-5 at the compute node 105-5 sends a message to the process 135-6 at the compute node 105-6, the number of links (the hop count) is four (the link 111-4, the link 111-1, the link 111-2, and the link 111-5).

Control then continues to block 410 where, in response to the detection of the sub-optimal communication, the task layout optimizer 150 selects pairs of the processes 135 executing at respective pairs of the compute nodes 105 that the task layout optimizer 150 desires to swap between their respective compute nodes 105. The task layout optimizer 150 further builds the migration event 300 and sets the first compute node identifier 315 and the second compute node identifier 320 to specify the selected compute nodes 105. Control then continues to block 415 where the task layout optimizer 150 sends the broadcast migration event 300 to the root compute node 105-1 of the partition 200 to which the compute nodes 105 in the migration event 300 belong. The migration event 300 is received and processed by the root compute node 105-1, as further described below with reference to FIG. 5. Control then continues to block 499 where the logic of FIG. 4 returns.

Figure 5:
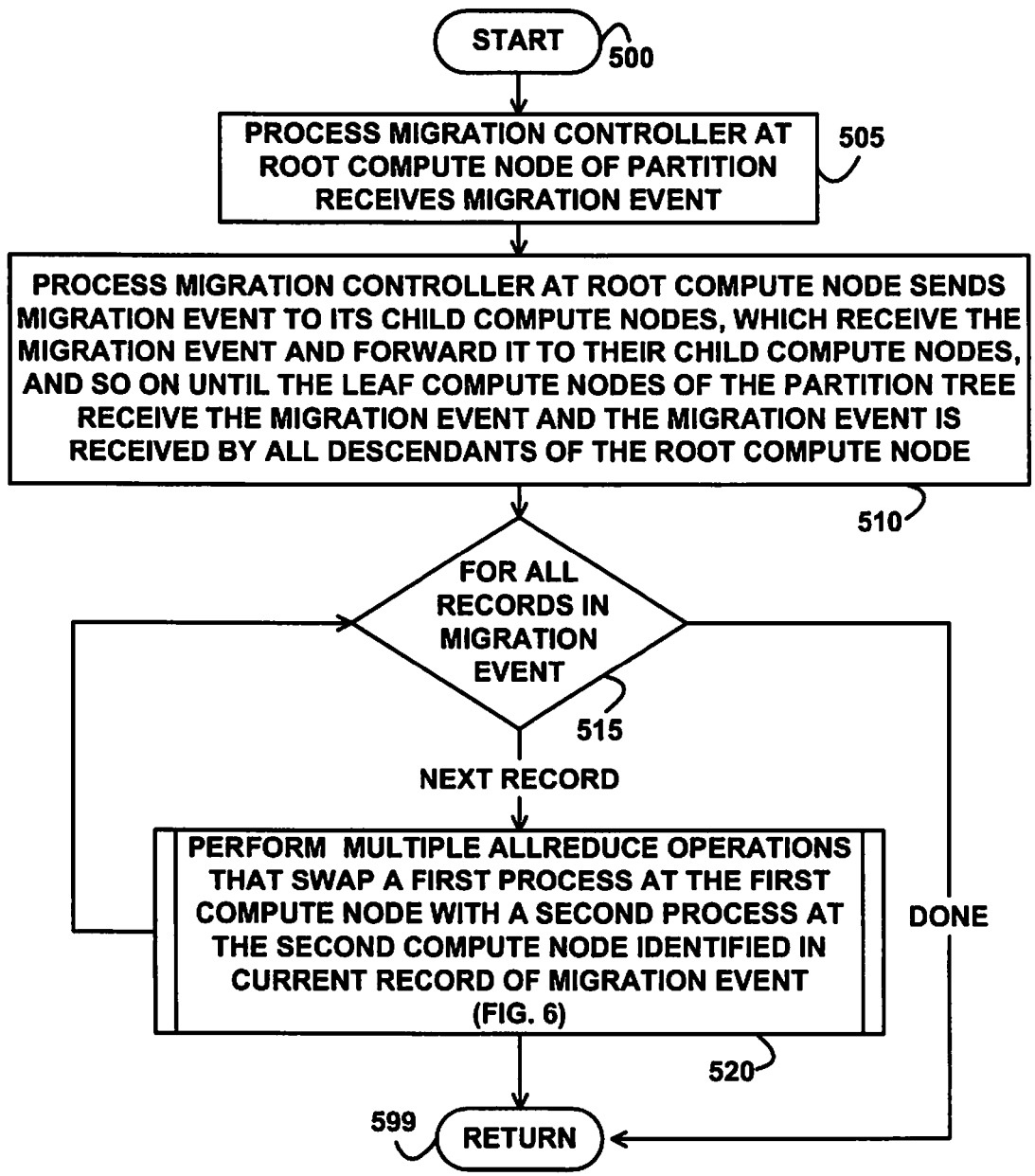
FIG. 5 depicts a flowchart of example processing for a process migration controller, according to an embodiment of the invention.

FIG. 5 depicts a flowchart of example processing for a process migration controller 140, according to an embodiment of the invention. Control begins at block 500. Control then continues to block 505 where the process migration controller 140 at the root compute node 105-1 of a partition 200 receives a migration event 300.

Control then continues to block 510 where the process migration controller 140 at the root compute node 105-1 sends the migration event 300 to its child compute nodes 105, which receive the migration event 300 and forward it to their child compute nodes 105. This receiving of the migration event 300 from a compute node's parent and forwarding to the compute node's children continues downward through all of the descendants of the root compute node 105-1 until the leaf compute nodes of the tree (which have no child compute nodes 105) receive the migration event 300. All of the descendants of the root compute node 105-1 have now received the migration event 300. As an example of the processing of blocks 505 and 510 using the compute nodes 105 of FIG. 2, the root compute node 105-1 receives the migration event 300 and forwards the migration event 300 to its child compute nodes 105-2 and 105-3, which receive and forward the migration event 300 to their respective child compute nodes 105-4, 105-5, 105-6, and 105-7, which are the leaf compute nodes of the partition 200.

Control then continues to block 515 where a loop is started that is executed by the process migration controller 140 at each of the compute nodes 105 in the partition 200, in order to process each of the records (e.g., the records 305 and 310) in the migration event 300. At block 515, the process migration controller 140 at each compute node 105 in the partition 200 determines whether a record that is unprocessed by the loop exists in the received migration event 300. As long as an unprocessed record in the migration event 300 remains, control continues from block 515 to block 520 where the compute nodes 105 in the partition 200 perform multiple allreduce XOR operations that swap a first process at the first compute node 315 with a second process at the second compute node 320, as further described below with reference to FIG. 6.

Control then returns to block 515 where the process migration controller 140 once again determines whether an unprocessed record exists in the migration event 300, as previously described above. When all of the records in the migration event 300 have been processed by the loop that starts at block 515, control continues from block 515 to block 599 where the logic of FIG. 5 returns.

Figure 6:
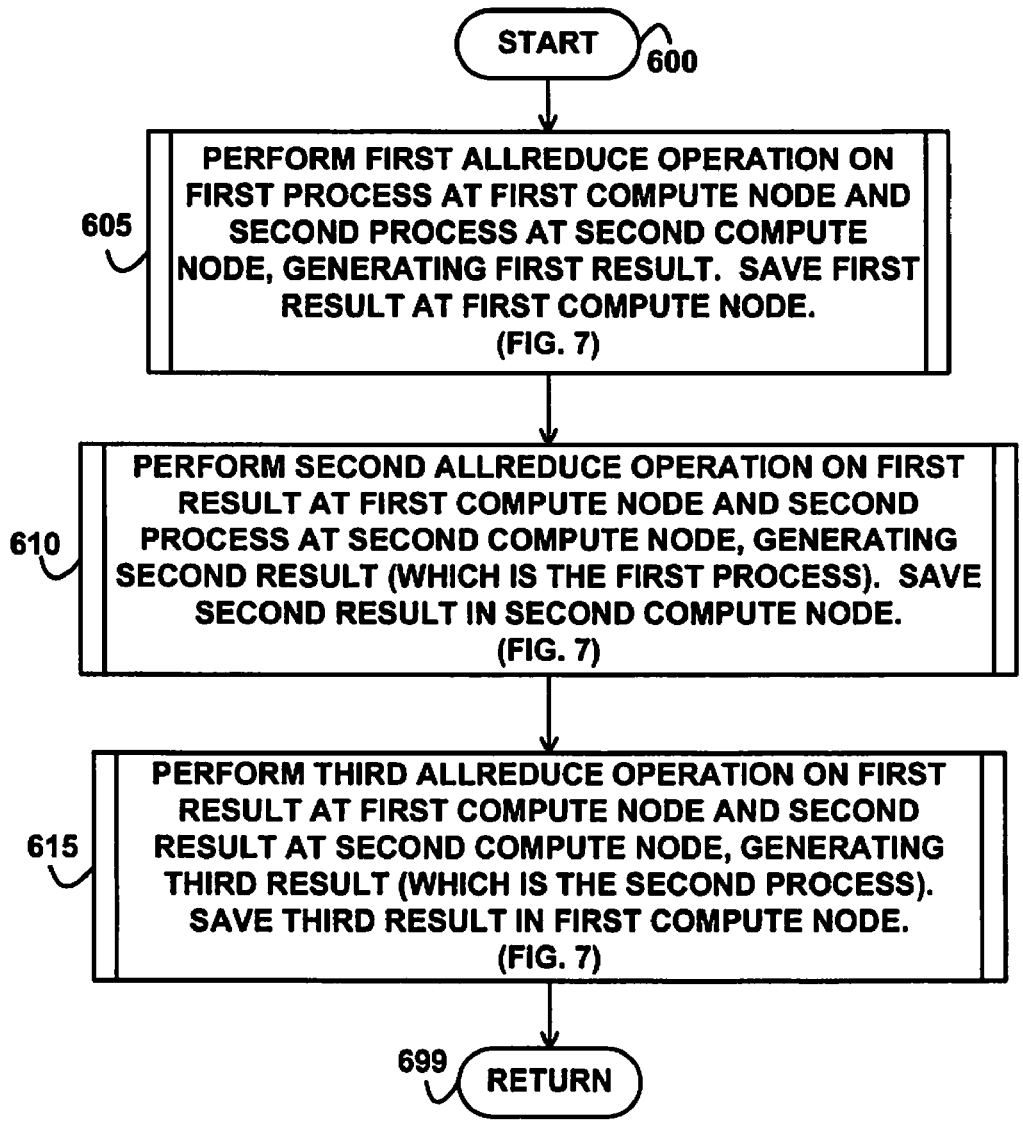
FIG. 6 depicts a flowchart of example processing for performing multiple allreduce operations that swap processes, according to an embodiment of the invention.

FIG. 6 depicts a flowchart of example processing for performing multiple allreduce XOR operations that swap the processes at the compute nodes that are identified in the current record of the migration event, according to an embodiment of the invention. Control begins at block 600.

Control then continues to block 605 where (as further described below with reference to FIG. 7) all of the compute nodes 105 of the partition 200 perform a first allreduce XOR operation on a first process (contributed by the first compute node 315) and a second process (contributed by the second compute node 320. All other compute nodes contribute zeros to the allreduce XOR operation. The first allreduce XOR operation generates a first result. The first result is saved at the first compute node 315, replacing the contents of the first process. The logic of FIG. 6 passes to the logic of FIG. 7 a parameter that identifies the first compute node as the compute node where the first result is to be saved. A passed parameter between FIGS. 6 and 7, as described herein, is used for convenience of exposition only, and in other embodiments any appropriate relationship between the example logic of FIGS. 6 and 7 may be used.

Control then continues to block 610 where (as further described below with reference to FIG. 7) all of the compute nodes 105 of the partition 200 perform a second allreduce XOR operation on the first result (contributed by the first compute node 315) and the second process (contributed by the second compute node 320). The second allreduce XOR operation generates a second result, which is identical to the first process because of the nature of an XOR operation. The second result (the first process) is saved at the second compute node, replacing the contents of the second process. The logic of FIG. 6 passes to the logic of FIG. 7 a parameter that identifies the second compute node as the compute node where the second result (the first process) is to be saved.

Control then continues to block 615 where (as further described below with reference to FIG. 7) all the compute nodes 105 of the partition 200 perform a third allreduce XOR operation on the first result (contributed by the first compute node) and the second result (the first process) (contributed by the second compute node). The third allreduce XOR operation generates a third result, which is identical to the second process because of the nature of an XOR operation. The third result (the second process) is saved at the first compute node, replacing the contents of the first result, which previously replaced the contents of the first process. The logic of FIG. 6 passes to the logic of FIG. 7 a parameter that identifies the first compute node as the compute node where the third result (the second process) is to be saved.

The processes 135 at the first compute node and the second compute node have now been swapped, or moved, between the first compute node 315 and the second compute node 320, so that the first process (formerly at the first compute node 315) is now stored, and is capable of executing, or does execute, at the second compute node 320, and the second process (formerly at the second compute node 320) is now stored, and is capable of executing, or does execute, at the first compute node 315. The second process is no longer at the second compute node 320 because its contents have been overwritten by the first process. The first process is no longer at the first compute node 315 because its contents have been overwritten, initially by the first result and then by the second process.

Control then continues to block 699 where the logic of FIG. 6 returns.

Figure 7:
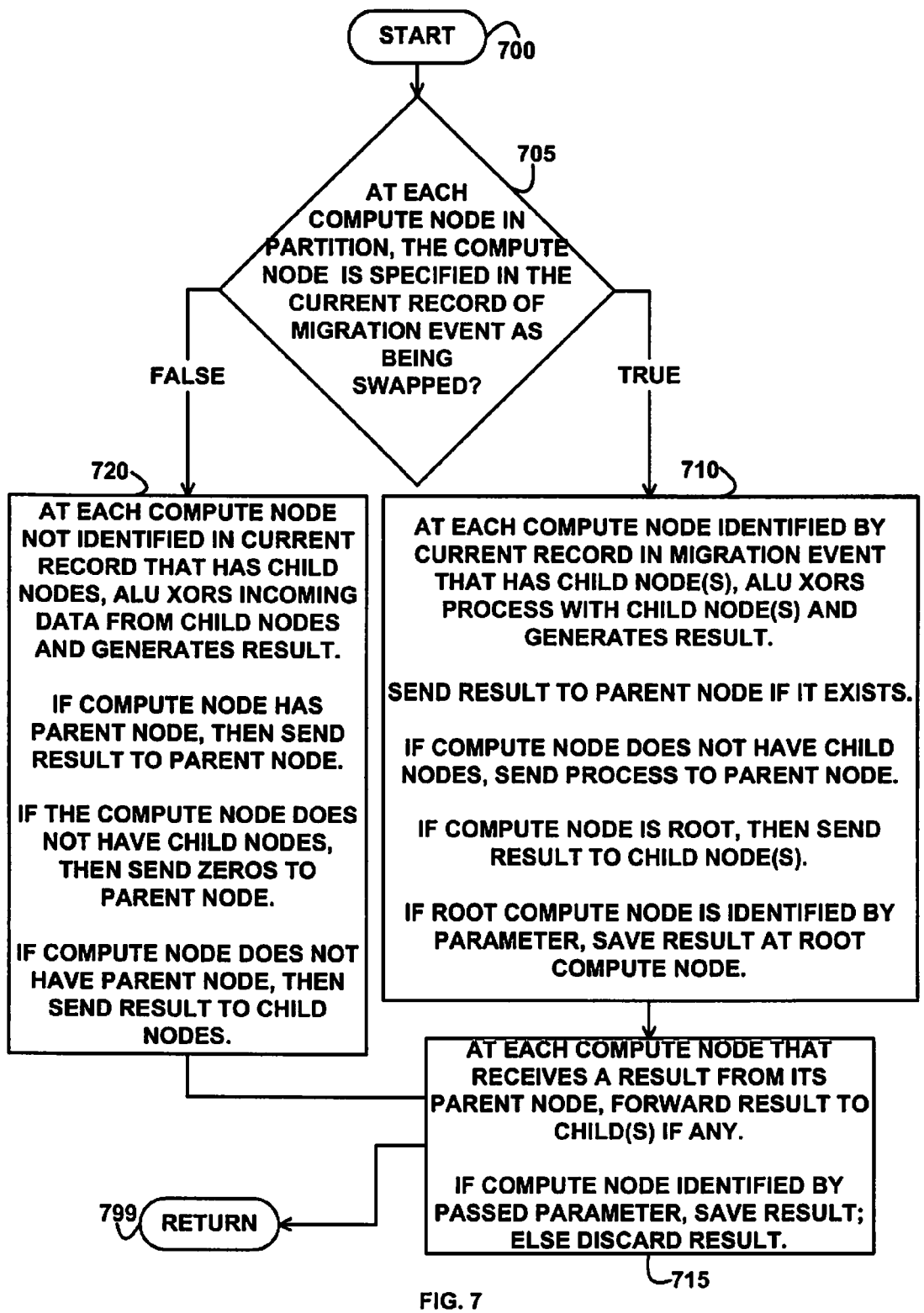
FIG. 7 depicts a flowchart of example processing for performing an allreduce operation, according to an embodiment of the invention.

FIG. 7 depicts a flowchart of example processing for performing an allreduce XOR operation by the process migration controllers and the ALU of all compute nodes in a partition, according to an embodiment of the invention. Control begins at block 700. Control then continues to block 705 where, at each compute node 105 in the partition 200, the process migration controller 140 determines whether the compute node 105 is specified in the current record of the migration event 300 as a compute node whose process is to be swapped. That is, the process migration controller 140 determines if its compute node (the compute node at which the process migration controller 140 executes) is specified by the first compute node identifier 315 or the second compute node identifier 320 in the current record of the migration event 300.

If the determination at block 705 is true, then the compute node 105 at which the process migration controller 140 executes is one of the compute nodes whose process 135 needs to be swapped, so control continues to block 710. As illustrated in block 710, at each compute node 105 in the partition 200 that is identified in the current record in the migration event 300 and that has child compute node(s), the process migration controller 140 at that compute node 105 instructs its ALU 125 to perform an XOR operation or operations on the process 135 at that compute node 105 and the incoming data from its child compute node(s) via the global combining network 111.

As further illustrated at block 710, if the compute node 105 has a parent compute node, the ALU 125 sends the result of this XOR operation to its parent compute node. If the compute node 105 does not have child compute node(s) (in which case the compute node 105 is a leaf compute node), the process migration controller 140 sends the process 135 that is stored at the compute node to its parent compute node. If the compute node 105 does not have a parent compute node (in which case the compute node 105 is the root compute node 105-1), then the process migration controller 140 instructs the ALU 125 to send the result of the XOR operation to the child compute node(s) in a broadcast message. If the compute node at which the process migration controller 140 executes is the root compute node 105-1 and the root compute node 105-1 is identified by the parameter that was passed by the logic of FIG. 6, then the process migration controller 140 at the root compute node 105-1 stores the result of the XOR operation at the root compute node 105-1, replacing the contents of the process 135 at the root compute node 105-1. If the logic of FIG. 7 is processing the first or third allreduce XOR operation, the passed parameter identifies the first compute node 315, and if the logic is processing the second allreduce XOR operation, the passed parameter identifies the second compute node 320, as previously described above with reference to FIG. 6.

Control then continues to block 715 where, at each compute node 105 in the partition 200, if the compute node 105 has a parent compute node, the compute node 105 receives a result (in the broadcast message) from its parent compute node and sends or forwards the received result (in a broadcast message) to its child compute node(s), if any. If the compute node 105 is identified by the parameter passed by the logic of FIG. 6, then the process migration controller 140 at the compute node 105 stores the received result at the compute node 105, replacing the contents of its process 135. In an embodiment where the compute nodes 105 only store one process 135, the process migration controller 140 at the compute node 105 replaces the contents of its one process with the received result. In an embodiment where the compute nodes 105 may store more than one process 135, the process migration controller 140 at the compute node 105 replaces the contents of the process identified in the current record of the migration event 300 with the received result.

Also at block 715, if the compute node 105 is not identified by the passed parameter, then the process migration controller 140 at the compute node 105 discards the received result after forwarding the result to its child compute node(s), if any. In this way, all of the compute nodes 105 in the partition 200 receive the result of the allreduce XOR operation, although some of the compute nodes 105 merely forward the result to their child compute node(s) and do not save the result. Control then continues to block 799 where the logic of FIG. 7 returns.

If the determination at block 705 is false, then the compute node 105 is not identified in the current record of the migration event 300 as storing a process 135 that needs to be swapped, so control continues to block 720. As illustrated in block 720, at each compute node 105 in the partition 200 that is not identified in the current record in the migration event 300 and that has child compute node(s), the process migration controller 140 at that compute node 105 instructs its ALU 125 to perform an XOR operation or operations on incoming data from its child compute nodes 105 and on zeros supplied by the process migration controller 140. The process migration controller 140 supplies zeros to its ALU 125 as input to the XOR operation instead of supplying its process 135. If the compute node 105 has a parent compute node, then the ALU 125 sends the result of the XOR operation to the parent compute node. If the compute node 105 does not have a child compute node(s) (in which case the compute node 105 is a leaf compute node), then the process migration controller 140 sends zeros to the parent compute node. If the compute node 105 does not have a parent compute node (in which case the compute node 105 is the root compute node 105-1), then the ALU 125 sends the result of the XOR operation to the child compute node(s) in a broadcast message. Control then continues to block 715, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
receiving from a task layout optimizer a migration event at a plurality of compute nodes connected via a global combining network, wherein the migration event comprises a specification of a first compute node and a specification of a second compute node and a request to swap a first process that executes at the first compute node with a second process that executes at the second compute node, wherein the task layout optimizer selected the first process and the second process;
performing a plurality of allreduce XOR operations at the plurality of compute nodes, wherein, in response to the migration event, the plurality of allreduce XOR operations swap the first process at the first compute node with the second process at the second compute node, wherein the performing further comprises each of the plurality of compute nodes contributes respective input to the plurality of allreduce XOR operations and receives respective output from the plurality of allreduce XOR operations, wherein the performing further comprises performing a first allreduce XOR operation on the first and the second process, wherein the first allreduce XOR operation generates a first result and storing the first result at the first compute node, wherein the performing removes the first process from the first compute node and removes the second process from the second compute node; and
after the performing, executing the first process at the second compute node and executing the second process at the first compute node.

2. The method of claim 1, wherein the receiving further comprises:
receiving the migration event at a root compute node of a partition; and
sending the migration event to all descendant compute nodes of the root compute node.

3. The method of claim 1, wherein the storing the first result at the first compute node further comprises:
replacing the first process at the first compute node with the first result.

4. The method of claim 1, wherein the performing the plurality of allreduce XOR operations at the plurality of compute nodes further comprises:
performing a second allreduce XOR operation on the first result and the second process, wherein the second allreduce XOR operation generates a second result that comprises the first process; and
storing the second result at the second compute node.

5. The method of claim 4, wherein the storing the second result at the second compute node further comprises:
replacing the second process at the second compute node with the second result.

6. The method of claim 4, wherein the performing the plurality of allreduce XOR operations at the plurality of compute nodes further comprises:
performing a third allreduce XOR operation on the first result and the second result, wherein the third allreduce XOR operation generates a third result that comprises the second process; and
storing the third result at the first compute node.

7. The method of claim 6, wherein the storing the third result at the first compute node further comprises:
replacing the first result at the first compute node with the third result.

8. A method for deploying computing services, comprising:
integrating computer readable code into a computer system, wherein the code in combination with the computer system performs the method of claim 1.

9. A non-transitory, computer-readable storage medium encoded with instructions, wherein the instructions when executed comprise:
receiving from a task layout optimizer a migration event at a plurality of compute nodes connected via a global combining network, wherein the migration event comprises a specification of a first compute node and a specification of a second compute node and a request to swap a first process that executes at the first compute node with a second process that executes at the second compute node, wherein the task layout optimizer selected the first process and the second process, wherein the receiving further comprises receiving the migration event at a root compute node of a partition and sending the migration event to all descendant compute nodes of the root compute node;

performing a plurality of allreduce XOR operations at the plurality of compute nodes, wherein, in response to the migration event, the plurality of allreduce XOR operations move the first process from the first compute node to the second compute node and move the second process from the second compute node to the first compute node, wherein the performing further comprises each of the plurality of compute nodes contributes respective input to the plurality of allreduce XOR operations and receives respective output from the plurality of allreduce XOR operations, wherein the performing further comprises performing a first allreduce XOR operation on the first and the second process, wherein the first allreduce XOR operation generates a first result and storing the first result at the first compute node, wherein the performing removes the first process from the first compute node and removes the second process from the second compute node; and after the performing, executing the first process at the second compute node and executing the second process at the first compute node.

10. The signal-bearing medium of claim 9, wherein the storing the first result at the first compute node further comprises:
replacing the first process at the first compute node with the first result.

11. The signal-bearing medium of claim 10, wherein the performing the plurality of allreduce XOR operations at the plurality of compute nodes further comprises:
performing a second allreduce XOR operation on the first result and the second process, wherein the second allreduce XOR operation generates a second result that comprises the first process; and
storing the second result at the second compute node.

12. The signal-bearing medium of claim 11, wherein the storing the second result at the second compute node further comprises:
replacing the second process at the second compute node with the second result.

13. The signal-bearing medium of claim 11, wherein the performing the plurality of allreduce XOR operations at the plurality of compute nodes further comprises:
performing a third allreduce XOR operation on the first result and the second result, wherein the third allreduce XOR operation generates a third result that comprises the second process; and
storing the third result at the first compute node.

14. The signal-bearing medium of claim 13, wherein the storing the third result at the first compute node further comprises:
replacing the first result at the first compute node with the third result.

15. A computer system comprising:
a global combining network; and
a plurality of compute nodes connected via the global combining network, wherein the plurality of compute nodes receive from a task layout optimizer a migration event comprising a specification of a first compute node and a specification of a second compute node and a request to swap a first process that executes at the first compute node with a second process that executes at the second compute node, wherein the task layout optimizer selected the first process and the second process, and in response to the migration event, the plurality of compute nodes perform a plurality of allreduce XOR operations that swap a first process at the first compute node with a second process at the second compute node, wherein each of the plurality of compute nodes contributes input to the allreduce XOR operation and receives output from the allreduce XOR operation, wherein the perform of the allreduce XOR operations removes the first process from the first compute node and removes the second process from the second compute node, and after the perform of the allreduce XOR operations, the second compute node executes the first process and the first compute node executes the second process.

16. The computer system of claim 15, wherein the plurality of compute nodes further perform a first allreduce XOR operation, wherein the first compute node contributes the first process to the first allreduce XOR operation, the second compute node contributes the second process to the first allreduce XOR operation, and all other of the compute nodes contribute zeros to the first allreduce XOR operation, and wherein the first compute node replaces the first process with a first result of the first allreduce XOR operation.

17. The computer system of claim 16, wherein the plurality of compute nodes further perform a second allreduce XOR operation, wherein the first compute node contributes the first result to the second allreduce XOR operation, the second compute node contributes the second process to the second allreduce XOR operation, and all other of the compute nodes contribute zeros to the second allreduce XOR operation, and wherein the second compute node replaces the second process with a second result of the second allreduce XOR operation, wherein the second result comprises the first process.

18. The computer system of claim 17, wherein the plurality of compute nodes further perform a third allreduce XOR operation, wherein the first compute node contributes the first result to the third allreduce XOR operation, the second compute node contributes the second result to the third allreduce XOR operation, and all other of the compute nodes contribute zeros to the third allreduce XOR operation, and wherein the first compute node replaces the first result with a third result of the third allreduce XOR operation, wherein the third result comprises the second process.

* * * * *